(12) United States Patent
Knill et al.

(10) Patent No.: US 9,350,265 B2
(45) Date of Patent: May 24, 2016

(54) AC TIED INVERTER, SYSTEM AND METHOD

(75) Inventors: Alexander Charles Knill, Tronoheim (NO); Joseph John Nathaniel Adam, Cambridgeshire (GB); Mark Christopher Wells, Mid Glamorgan (GB); Andrew Henry John Larkins, Bershire (GB)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 14/006,633

(22) PCT Filed: Mar. 28, 2012

(86) PCT No.: PCT/GB2012/050687
§ 371 (c)(1),
(2), (4) Date: Sep. 20, 2013

(87) PCT Pub. No.: WO2012/131361
PCT Pub. Date: Oct. 4, 2012

(65) Prior Publication Data
US 2014/0009981 A1    Jan. 9, 2014

(30) Foreign Application Priority Data

Mar. 29, 2011  (GB) .................................. 1105280.0
Mar. 29, 2011  (GB) .................................. 1105281.8
Mar. 29, 2011  (GB) .................................. 1105284.2
Mar. 29, 2011  (GB) .................................. 1105290.9

(51) Int. Cl.
*H02M 3/337* (2006.01)
*H02M 7/48* (2007.01)
(Continued)

(52) U.S. Cl.
CPC ............. *H02M 7/4807* (2013.01); *H02J 3/383* (2013.01); *H02M 3/1582* (2013.01);
(Continued)

(58) Field of Classification Search
CPC . H02M 3/337; H02M 3/3376; H02M 3/3378; H02M 7/4807; H02M 7/4826; H02M 7/797; H02M 2001/007; H02M 3/1582; H02M 3/3374; H02J 3/383; Y02E 10/563
See application file for complete search history.

(56) References Cited

U.S. PATENT DOCUMENTS 5,138,249 A    8/1992  Capel
6,728,118 B1   4/2004  Chen et al.
(Continued)

FOREIGN PATENT DOCUMENTS

WO    2006 081531    8/2006

OTHER PUBLICATIONS

Li, Q. et al., "A review of the Single Phase Photovoltaic Module Integrated Converter Topologies With Three Different DC Link Configuration", IEEE Transactions on Power Electronics, IEEE Service Center, vol. 23, No. 3, pp. 1320-1333, XP011206938, (May 1, 2008).

(Continued)

*Primary Examiner* — Fred E Finch, III
(74) *Attorney, Agent, or Firm* — Oblon, McClelland, Maier & Neustadt, L.L.P

(57) ABSTRACT

An AC tied inverter connectable to an AC source, the AC tied inverter including a DC to DC current fed push-pull converter operable to generate a current waveform from a DC voltage source, the current waveform being substantially synchronized to the AC source, the push-pull converter including a transformer including a first side connectable to a battery and a second side connectable to the AC source, wherein each of the two primary sides is connected to ground via a switching transistor; and respective voltage clamps are connected between the respective primary side of the transformer and the respective switching transistor, the voltage clamp commutating the current from the respective primary side of the transformer when the switching transistor is turned off.

19 Claims, 14 Drawing Sheets

(51) Int. Cl.
  H02M 7/797 (2006.01)
  H02M 3/158 (2006.01)
  H02J 3/38 (2006.01)
  H02M 3/335 (2006.01)
  H02M 1/00 (2006.01)

(52) U.S. Cl.
  CPC .............. H02M 3/3374 (2013.01); H02M 7/48 (2013.01); H02M 7/797 (2013.01); H02J 3/386 (2013.01); H02M 3/33569 (2013.01); H02M 2001/007 (2013.01); Y02E 10/563 (2013.01); Y02E 10/763 (2013.01)

(56) References Cited

U.S. PATENT DOCUMENTS

| | | | |
|---|---|---|---|
| 2004/0217747 A1 | 11/2004 | Ying et al. | |
| 2005/0105224 A1* | 5/2005 | Nishi | 361/18 |
| 2006/0171182 A1 | 8/2006 | Siri et al. | |
| 2007/0159866 A1 | 7/2007 | Siri | |
| 2007/0247877 A1 | 10/2007 | Kwon et al. | |
| 2008/0062724 A1 | 3/2008 | Feng et al. | |
| 2008/0094860 A1 | 4/2008 | Falk | |
| 2008/0266922 A1 | 10/2008 | Mumtaz et al. | |
| 2008/0304300 A1 | 12/2008 | Raju et al. | |
| 2009/0160259 A1* | 6/2009 | Naiknaware et al. | 307/82 |
| 2010/0014325 A1 | 1/2010 | Raju et al. | |
| 2010/0133904 A1 | 6/2010 | Klodowski et al. | |
| 2011/0103117 A1* | 5/2011 | Yoneda | H02M 7/48 363/132 |
| 2011/0157928 A1* | 6/2011 | Ku et al. | 363/37 |
| 2011/0175662 A1* | 7/2011 | Said El-Barbari et al. | 327/319 |
| 2012/0013192 A1* | 1/2012 | Park et al. | 307/80 |
| 2012/0081933 A1* | 4/2012 | Garrity | 363/37 |
| 2012/0127764 A1* | 5/2012 | Phadke et al. | 363/37 |
| 2012/0230066 A1* | 9/2012 | Lai et al. | 363/37 |
| 2012/0250359 A1 | 10/2012 | Knill | |
| 2012/0250372 A1 | 10/2012 | Knill et al. | |
| 2012/0250373 A1 | 10/2012 | Adam | |
| 2012/0250374 A1 | 10/2012 | Knill | |

OTHER PUBLICATIONS

International Search Report Issued Feb. 6, 2013 in PCT/GB12/50687 Filed Mar. 28, 2012.
Written Opinion of the International Searching Authority Issued Feb. 6, 2013 in PCT/GB12/50687 Filed Mar. 28, 2012.
Great Britain Search Report Issued Aug. 3, 2011 in GB 1105290.9 Filed Mar. 29, 2011.
Great Britain Search Report Issued Aug. 3, 2011 in GB 1105284.2 Filed Mar. 29, 2011.
Great Britain Search Report Issued Aug. 3, 2011 in GB 1105281.8 Filed Mar. 29, 2011.
Great Britain Search Report Issued Aug. 3, 2011 in GB 1105280.0 Filed Mar. 29, 2011.
U.S. Appl. No. 14/055,057, filed Oct. 16, 2013, Knill.
Combined Chinese Office Action and Search Report issued Aug. 4, 2015 in Patent Application No. 2012800160423 (submitting English language translation only).

* cited by examiner

1301: Input, primary winding
1303: Output, primary winding
1305: Input, secondary winding
1307: Output, secondary winding 2311: Input, primary winding
2313: Output, primary winding
2315 Input, secondary winding
2317 Output, secondary winding

AC TIED INVERTER, SYSTEM AND METHOD

The present invention relates to an AC tied inverter, method and system.

It is becoming increasingly attractive for domestic consumers of electricity to provide electricity for the grid. This is particularly important given the rapid increase in electricity usage, especially during peak demand.

It is possible to provide this electricity using so-called "Grid-Tied Inverters". These are DC-DC converters which connect banks of batteries to the grid. These inverters tend to be very large and expensive. It is an aim of the present invention to address these issues.

It will be appreciated that, while these grid-tied inverters are typically connected to a mains electricity grid, they may also (or instead) be used in conjunction with other AC voltage sources, such as diesel generators, wind turbines or a local electricity distribution system.

According to a first aspect, there is provided an AC tied inverter connectable to an AC source, the AC tied inverter comprising a DC to DC current fed push-pull converter operable to generate a current waveform from a DC voltage source, the current waveform being substantially synchronised to the AC source, the push-pull converter comprising a transformer having a first side connectable to a battery and a second side connectable to the AC source, wherein each of the two primary sides is connected to ground via a switching transistor; and respective voltage clamps are connected between the respective primary side of the transformer and the respective switching transistor, the voltage clamp commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the first switch is configured to be on and the second switch is configured to be off, and after a predetermined period of current flow, the first switch is configured to be off, whereby a predetermined period thereafter the second switch is configured to be on.

Prior to the first switch being switched on again, the second switch may be configured to be switched off.

According to another aspect, there is provided a method of operating an AC tied inverter which is connectable to an AC source, the grid tied inverter comprising a DC to DC current fed push-pull converter, the method comprising generating a current waveform from a DC voltage source, the current waveform being substantially synchronised to the AC source, the push-pull converter comprising a transformer having a first side connectable to a battery and a second side connectable to the AC source, wherein each of the two primary sides is connected to ground via a switching transistor; and respective voltage clamps are connected between the respective primary side of the transformer and the respective switching transistor, wherein in the clamp, the method comprises commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the method comprises switching the first switch on and the second switch off, and after a predetermined period of current flow, switching the first switch off, whereby a predetermined period thereafter switching the second switch on.

Prior to the first switch being switched on again, the second switch may be switched off. According to another aspect, there is provided an AC tied inverter connectable to an AC source, the AC tied inverter comprising a DC to DC current fed push-pull converter operable to generate a current waveform from a DC voltage source, the current waveform being substantially synchronised to the AC source, and a transformer having a first side connected to the DC to DC current fed converter and a second side having an output line connectable to the AC source.

The DC to DC current fed converter may comprise a buck-boost stage connectable to the DC voltage source, wherein the buck-boost stage is active only during generation of a lower portion of a voltage waveform at the output line.

The lower portion of the voltage waveform at the output line, Vline may be $\leq n.Vbat$ where Vline is the voltage at the output line, n is the turns ratio of the transformer, and Vbat is the voltage of the DC voltage source.

The lower portion of the waveform at the output line, Vline may be $\leq n.Vbat+\delta$ where Vline is the voltage at the output line, n is the turns ratio of the transformer, Vbat is the voltage of the DC voltage source and $\delta$ is a predetermined voltage.

The inverter may comprise a monitoring device operable to monitor the phase of the voltage waveform at the output line, and the lower portion of the voltage waveform is determined in accordance with the phase of the voltage waveform.

The buck-boost stage may comprise a first switch connected between a first terminal of an inductor and the DC voltage source and a second switch connected between the first terminal of the inductor and ground, wherein the second terminal of the inductor is connected to the first side of the transformer.

Wherein when not active in the buck-boost mode, the second switch may be left open.

The inverter may comprise an inductor connected between the buck-boost stage and the first side of the transformer, wherein the push-pull converter is operable to generate the current waveform by charging and discharging the inductor at a controllable duty cycle, and wherein one or both of the inductor current and the duty cycle are controllable at or near the time of transition between a buck-boost mode in which the buck-boost stage is active and a boost mode in which the buck-boost stage is not active.

According to another aspect there is provided a method of controlling an AC tied inverter connectable to an AC source, the AC tied inverter comprising a DC to DC current fed push-pull converter, and the method comprising generating a current waveform from a DC voltage source, the current waveform being substantially synchronised to the AC source, and the inverter comprising a transformer having a first side connected to the DC to DC current fed converter and a second side having an output line connectable to the AC source.

The DC to DC current fed converter may comprise a buck-boost stage connectable to the DC voltage source, and the method comprises activating the buck-boost stage only during generation of a lower portion of a voltage waveform at the output line.

The lower portion of the voltage waveform at the output line, Vline may be ≤n.Vbat where Vline is the voltage at the output line, n is the turns ratio of the transformer, and Vbat is the voltage of the DC voltage source.

The lower portion of the waveform at the output line, Vline may be ≤n.Vbat+δ where Vline is the voltage at the output line, n is the turns ratio of the transformer, Vbat is the voltage of the DC voltage source and δ is a predetermined voltage.

The method may comprise monitoring the phase of the voltage waveform at the output line, and determining the lower portion of the voltage waveform in accordance with the phase of the voltage waveform.

The buck-boost stage may comprise a first switch connected between a first terminal of an inductor and the DC voltage source and a second switch connected between the first terminal of the inductor and ground, wherein the second terminal of the inductor is connected to the first side of the transformer.

When not active in the buck-boost mode, the method may comprise leaving the second switch open.

The inverter may comprise an inductor connected between the buck-boost stage and the first side of the transformer, and the method comprises generating the current waveform by charging and discharging the inductor at a controllable duty cycle, and wherein one or both of the inductor current and the duty cycle are controllable at or near the time of transition between a buck-boost mode in which the buck-boost stage is active and a boost mode in which the buck-boost stage is not active.

According to another aspect, there is provided an AC tied inverter comprising an unfolding circuit connectable to an AC source; and a DC to DC current fed converter operable to generate a current waveform from a battery, the current waveform being substantially synchronised to the AC source, wherein the unfolding circuit is operable, in a first mode, to convert the current into a sinusoidal waveform have an instantaneous voltage suitable for injection onto the AC source.

The unfolding circuit, in a second mode, may be operable to convert AC electricity obtained from the AC source into a fully rectified AC current, and the DC to DC converter is further operable to convert the fully rectified AC current into a DC current for storage in the battery.

The unfolding circuit may comprise a bridge arrangement of transistor switches, and the transistor switches each comprise a Field Effect Transistor.

The Field Effect Transistors may be configured such that the body diodes within the transistors are arranged as a full-bridge rectifier, and configured such that in use during the second mode, the switching transistors are open.

The DC to DC current fed converter may comprise a transformer having a first side and a second side, the first side having a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the first switch is configured to be on and the second switch is configured to be off, and after a predetermined period of current flow, the first switch is configured to be off, whereby a predetermined period thereafter the second switch is configured to be on.

Prior to the first switch being switched on again, the second switch may be configured to be switched off.

According to another aspect, there is provided a method of operating an AC tied inverter, the inverter comprising an unfolding circuit connectable to an AC source; and a DC to DC current fed converter, the method comprising generating a current waveform from a battery, the current waveform being substantially synchronised to the AC source, wherein method comprises in the unfolding circuit when operating in a first mode, converting the current into a sinusoidal waveform having an instantaneous voltage suitable for injection onto the AC source.

In the unfolding circuit when operating in a second mode, the method may comprise converting AC electricity obtained from the AC source into a fully rectified AC current, and in the DC to DC converter the method comprises converting the fully rectified AC current into a DC current for storage in the battery.

The unfolding circuit may comprise a bridge arrangement of transistor switches, and the transistor switches each comprise a Field Effect Transistor.

The Field Effect Transistors may be configured such that the body diodes within the transistors are arranged as a full-bridge rectifier, and the method may comprise during the second mode, opening the switching transistors.

The DC to DC current fed converter may comprise a transformer having a first side and a second side, the first side having a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, and the method may comprise allowing current flow through the first winding by switching the first switch on and the switching the second switch off, and after a predetermined period of current flow, switching the first switch off, whereby a predetermined period thereafter switching the second switch on.

Prior to the first switch being switched on again, the method may comprise switching off the second switch.

According to another aspect, there is provided an AC tied inverter connectable to an AC source, the AC tied inverter comprising a DC to DC current fed push-pull converter operable to generate a current waveform from a DC voltage source, the current waveform being substantially synchronised to the AC source, the push-pull converter comprising a transformer having a first side connectable to a battery and a second side connectable to the AC source, wherein each of the two primary sides is connected to ground via a switching transistor; and respective voltage clamps are connected between the respective primary side of the transformer and the respective switching transistor, the voltage clamp commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the first switch is configured to be on and the second switch is configured to be off, and after a predetermined period of current flow, the first switch is configured to be off, whereby a predetermined period thereafter the second switch is configured to be on.

Prior to the first switch being switched on again, the second switch may be configured to be switched off.

According to another aspect, there is provided a method of operating an AC tied inverter which is connectable to an AC source, the AC tied inverter comprising a DC to DC current fed push-pull converter, the method comprising generating a current waveform from a DC voltage source, the current waveform being substantially synchronised to the AC source, the push-pull converter comprising a transformer having a first side connectable to a battery and a second side connectable to the AC source, wherein each of the two primary sides is connected to ground via a switching transistor; and respective voltage clamps are connected between the respective primary side of the transformer and the respective switching transistor, wherein in the clamp, the method comprises commutating the current from the respective primary side of the transformer when the switching transistor is turned off.

The voltage clamp may comprise a capacitor connected to ground, and a switching transistor connected in series with the capacitor.

The first side of the transformer may have a first winding which is connected to a first transistor switch and a second transistor switch, the second transistor switch is a field effect transistor having the anode of the body diode connected to the first winding, whereby the first switch is connected to ground and the second switch is connected to a first capacitor, the first capacitor being connected between the second switch and ground, wherein to allow current flow through the first winding, the method comprises switching the first switch on and the second switch off, and after a predetermined period of current flow, switching the first switch off, whereby a predetermined period thereafter switching the second switch on.

Prior to the first switch being switched on again, the second switch may be switched off.

The AC source may be an electricity grid. Alternatively, the AC source may be a diesel generator, a wind turbine or a local electricity distribution system.

In another aspect, an electricity handling device may be provided which comprises an AC tied inverter, a load device powered by the AC source, a switching system for selectively connecting the AC tied inverter to the AC source, and the AC source to the load device, and a grid monitor for detecting when the AC source is failing and controlling the switching system to disconnect the AC tied inverter from the AC source and disconnect the load device from the AC source. When the AC tied inverter and the load device are disconnected from the AC source, the AC tied inverter provides power to the load device from the battery. When the grid monitor detects that the AC source has been restored the grid monitor controls the switching system to reconnect the load device to the AC source.

In another aspect, an electricity handling device comprising a plurality of AC tied inverters and a plurality of batteries. At least one of the AC tied inverters is configured in one or more of the following modes: an AC source to battery mode;
a battery to AC source mode;
a renewable energy source to battery mode; and
a renewable energy source to AC source mode.

As will be appreciated, different inverters of the electricity handling device may be configured in different modes at the same time, allowing flexible operation depending on the circumstances.

In another aspect, an electricity handling device comprises an AC tied inverter, and the AC source is wind turbine. The AC tied inverter comprises a control loop for synchronising the current waveform of the DC source with the AC source. The control loop is responsive to a detected speed of rotation of the blades of the wind turbine to control the AC tied inverter to vary the electrical load presented to the wind turbine as a function of the speed of rotation of the turbine blades to provide power tracking.

According to another aspect, there is provided a system comprising an AC tied inverter according to any one of the above embodiments connected between a DC voltage source and the AC source.

There is also provided a computer program containing computer readable instructions which when loaded onto a computer configure the computer to perform a method according to any one of the embodiments.

Embodiments of the present invention will now be described, by way of example only, and with reference to the accompanying drawings in which.

Figure 1:
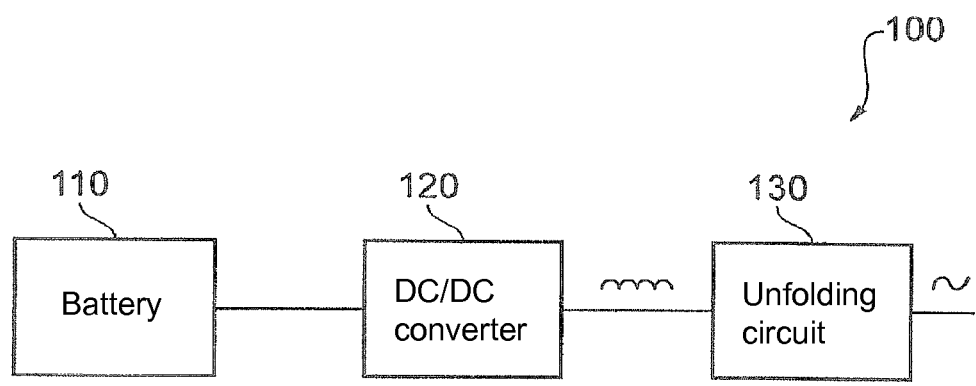
FIG. 1 shows a block diagram according an embodiment of the present invention.

With reference to FIG. 1, a system 100 is shown. The system 100 comprises a battery 110, a DC to DC converter 120 and an unfolding circuit 130. The DC to DC converter 120 and the unfolding circuit 130 form the grid tied inverter according to embodiments of the invention. The unfolding circuit 130 is connected to a mains electricity supply provided by the mains electricity grid (not shown) and the DC to DC converter 120 is connected to the battery 110.

It will be appreciated that, while the system is described with respect to a system 100 connected to a mains electricity grid, embodiments of the present invention apply equally to other AC voltages sources, such as diesel generators, wind turbines or a local electricity distribution system.

The battery 110 is, in embodiments, a 2 kWh battery which is typically made up of a number of battery cells. Each battery cell may be rated at 30 Ah. The battery 110 is a DC voltage source capable of delivering around 1 kW of power at any one time. The invention is not however, limited to this and any size and type of battery may be also used in embodiments.

The grid tied inverter is connected to the battery 110. The DC to DC converter 120 is connected to the battery 110 using, in embodiments, standard IEC form power inlets, which will typically include an integrated fuse unit (not shown). An example of this is a 4 pin XLR type male socket.

The output waveform from the DC to DC converter 120 is shown in FIG. 1. The output waveform from the DC to DC converter 120 is a current waveform that resembles a fully rectified signal. In other words, although the output from the DC to DC converter 120 is in fact a DC current and is not produced using a bridge circuit, it resembles and is shaped like a fully rectified signal as will be apparent from the discussion of FIG. 2.

The unfolding circuit 130 receives the fully rectified signal and switches the polarity of the output from the DC to DC converter 120 at 100 Hz to generate an AC signal that has an instantaneous voltage similar to that of the electricity grid. In other words, alternating ones of the "humps" of the current waveform generated by the DC to DC converter 120 are switched to an opposite polarity. The output of the unfolding circuit 130 is therefore an AC signal with a frequency of around 50 Hz to match that of the grid. This is shown in FIG. 1.

Although the above describes the system 100 as being suitable in one mode to transfer electricity which is stored on the battery 110 onto the grid, the system 100 can equally be used in reverse. In other words, the system 100 can operate in a second mode which allows the battery 110 to be charged using electricity supplied by the grid. Accordingly, one embodiment provides a bidirectional current fed DC to DC converter which relies on downstream unfolding circuitry to generated an AC waveform from its output.

Figure 2:
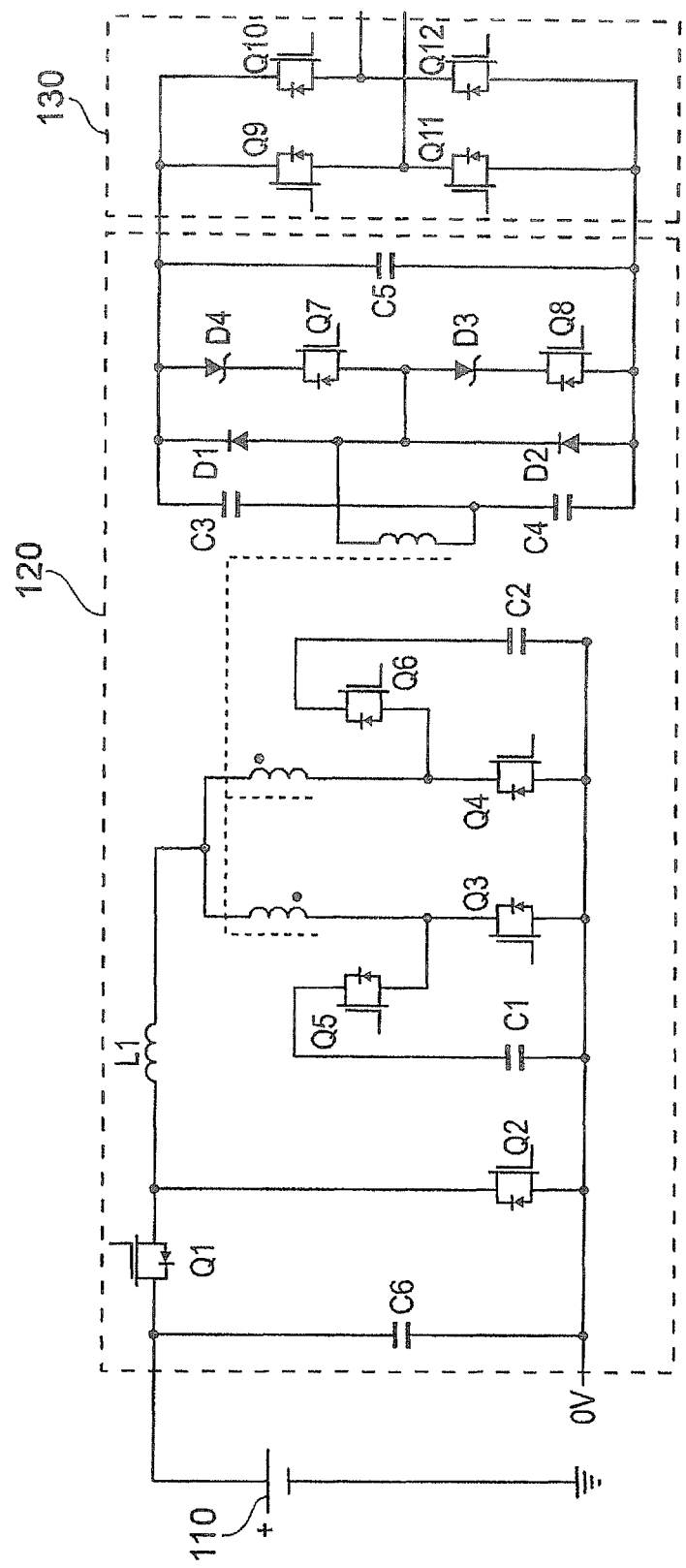
FIG. 2 shows a circuit diagram timing diagram explaining the DC-DC converter and the unfolding circuit shown in FIG. 1.

Referring to FIG. 2, the battery 110 is shown as connected to the DC to DC converter 120. The components of the DC to DC converter 120 are surrounded by a dashed box. The output of the DC to DC converter 120 is fed into the unfolding circuit 130 whose components are surrounded by another dashed box.

The operation of the DC to DC converter 120 will be described in more detail with reference to FIG. 3. However, a description of the structure of the DC to DC converter 120 and the unfolding circuit 130 will be provided with reference to FIG. 2.

The battery 110 is shown as a single cell device in FIG. 2 connected to the DC to DC converter 120. However, as noted above, in embodiments, the battery 110 comprises a plurality of cells.

The battery 110 is connected across a decoupling capacitor C6. A first terminal of a first switching transistor Q1 is connected in series with the battery 110. Connected between the second terminal of the first switching transistor Q1 and ground is a second switching transistor Q2. A first terminal of a first inductor L1 is connected to the second terminal of the first switching transistor Q1. The first switching transistor Q1, the second switching transistor Q2 and the first inductor L1 are arranged as a synchronous buck converter. The second terminal of the first inductor L1 is connected to a split primary winding of a transformer. In embodiments, the second terminal of the first inductor L1 is connected to a first terminal of a first primary winding of the transformer and a first terminal of a second primary winding of the transformer.

The first terminal of a third switching transistor Q3 is connected to the second terminal of the first primary winding and the second terminal of the third switching transistor Q3 is connected to ground. The first terminal of a fourth switching transistor Q4 is connected to the second terminal of the second primary winding and the second terminal of the fourth switching transistor Q4 is connected to ground.

A first terminal of a fifth switching transistor Q5 is connected between the second terminal of the first primary winding and the first terminal of the third switching transistor Q3. A first capacitor C1 is connected between the second terminal of the fifth switching transistor Q5 and ground. A first terminal of a sixth switching transistor Q6 is connected between the second terminal of the second primary winding and the first terminal of the fourth switching transistor. A second capacitor C2 is connected between the second terminal of the sixth switching transistor Q6 and ground.

A first terminal of the secondary winding of the transformer is connected to a second terminal of a third capacitor C3 and the first terminal of a fourth capacitor C4. The second terminal of the fourth capacitor C4 is connected to a negative rail. The first terminal of the third capacitor C3 is connected to a positive rail. A cathode terminal of a first diode D1 is also connected to the positive rail. The anode terminal of the first diode D1 is connected to a second terminal of the secondary winding of the transformer. The cathode terminal of a second diode D2 is also connected to the second terminal of the secondary winding of the transformer. The anode terminal of the second diode D2 is connected to the negative rail.

The cathode terminal of the second diode D2 is connected to the anode terminal of a third diode D3. An eighth switching transistor Q8 is connected between the between the cathode terminal of the third diode D3 and the negative rail. A second terminal of a seventh switching transistor Q7 is connected to the second terminal of the secondary winding of the transformer. The first terminal of the seventh switching transistor Q7 is connected to the cathode terminal of a fourth diode D4. The second terminal of the fourth diode D4 is connected to the positive rail. A fifth capacitor C5 is connected between the cathode terminal of the fourth diode D4 and the negative rail. It should be noted here that the third and fourth diodes D3 and D4 are Schottky diodes which exhibit a fast switching capability and which have a low forward voltage drop.

As noted before, connected to the DC-DC converter 120 is an unfolding circuit 130. The unfolding circuit 130 is connected in parallel to the fifth capacitor C5. The unfolding circuit 130 includes a ninth to twelfth switching transistor Q9-Q12. The ninth switching transistor Q9 has a first terminal connected to the positive rail and a second terminal connected to a negative output line. The tenth switching transistor Q10 is connected between the positive rail and a positive output line. The eleventh switching transistor Q11 is connected between the negative output line and the negative rail, and the twelfth switching transistor Q12 is connected between the negative rail and the positive output line. The positive and negative output lines connect to the electricity grid. In embodiments, filter circuitry is provided between the positive and negative output lines and the electricity grid.

It should be noted here that the ninth to twelfth switching transistors Q9 to Q12 are power MOSFET (Metal Oxide Semi-conductor Field Effect Transistors) transistors. This means that a diode exists between the drain (cathode) and source (anode) of the MOSFET. This is sometimes referred to as the "body diode" and exists in any field effect type transistor. In the ninth switching transistor Q9 the drain is connected to the positive rail, in the tenth switching transistor Q10 the drain is connected to the positive rail, in the eleventh switching transistor Q11, the drain is connected to the negative output rail and in the twelfth switching transistor Q12, the drain is connected to the positive output rail.

In other words, in the first mode (battery to grid), the ninth to twelfth switching transistors Q9 to Q12 are switched to generate an appropriate output waveform, and in the second mode (grid to battery), the ninth to twelfth switching transistors Q9 to Q12 are not switched meaning that the body diode between the drain and source of each MOSFET cause the ninth to twelfth switching transistors Q9 to Q12 to operate as a full bridge rectifier which produces a fully rectified signal across the fifth capacitor C5. This ensures that the grid tied inverter can operate in both modes and is therefore bi-directional. This reduces the size and cost of the grid tied inverter which might conventionally have had one circuit operating in the first mode and a second, parallel, circuit operating in the second mode.

Figure 3:
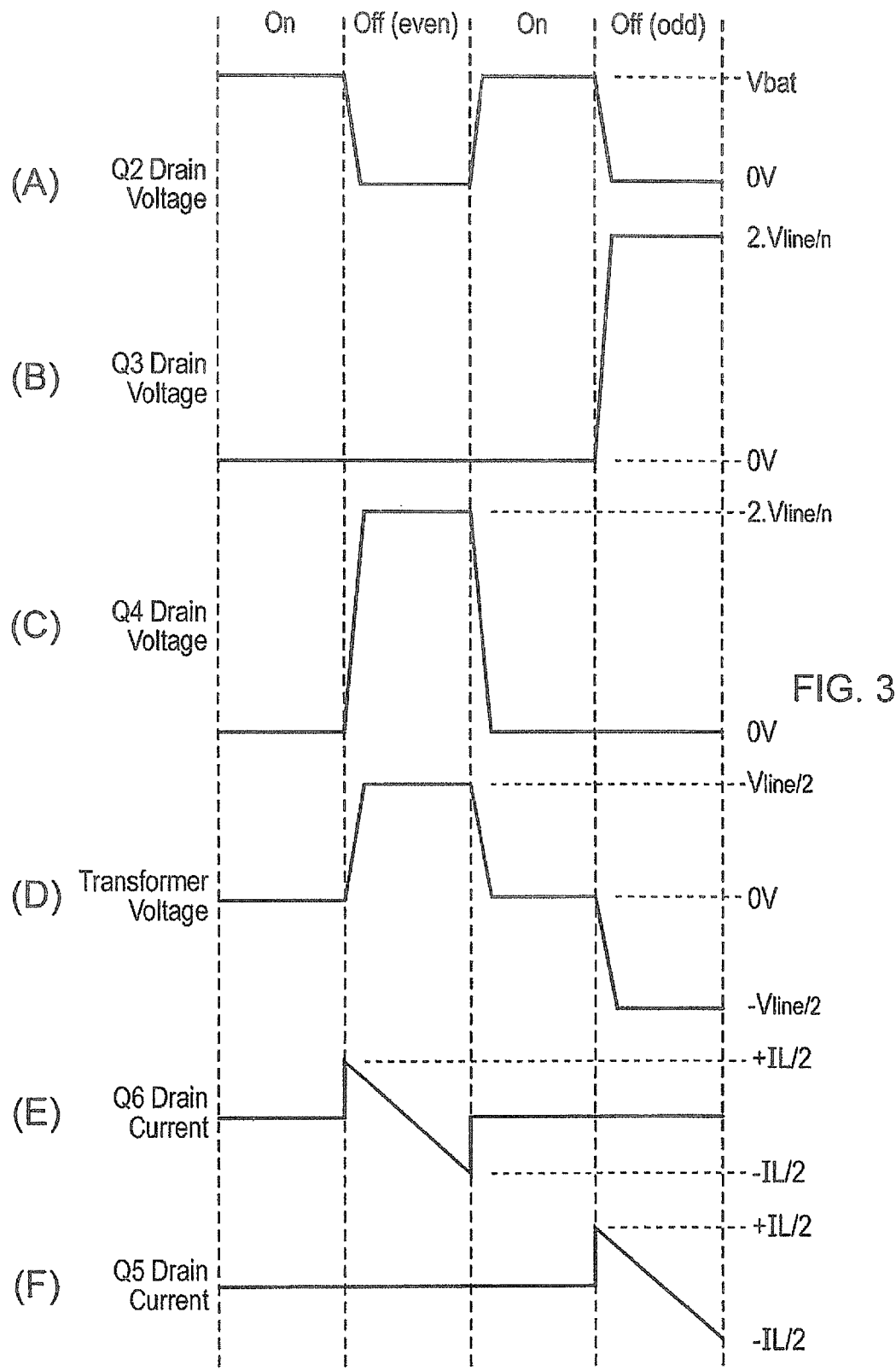
FIG. 3 shows a timing diagram associated with the circuit diagram of FIG. 2.

Referring to FIG. 3, an explanation of the operation of the DC to DC converter 120 will now be given.

As will be appreciated by the skilled person, the DC to DC converter 120 is configured as a current fed push-pull converter. In other words, the output from the DC to DC converter 120 resembles a rectified current signal. This is different to conventional. DC to DC converter 120 in grid tied inverters which produce voltage waveforms. However, any minor differences between the voltage waveform generated by the grid tied inverter and the grid onto which the electricity is fed will result in large currents being generated (due to the low resistance of the grid and filters placed between the grid tied inverter and the grid). Therefore, conventionally, designers have altered the resistance characteristics of the filters to mitigate the large current values. However, this is very complicated and results in complex circuitry.

In order to address this, the output from the DC to DC converter 120 is a current waveform. This reduces the need to adjust the filter resistance and therefore reduces circuitry complexity.

In order to generate the current waveform, the duty cycle of the DC to DC converter 120 is adjusted. The control mechanism to generate the duty cycle will be explained later with reference to FIG. 5.

In addition to the DC to DC converter 120 being configured as a current fed push-pull converter, additional switches Q1 and D2 are included as shown in FIG. 2. The inclusion of the switches Q1 and Q2 provide an advantage. Although not conventional in the field of grid tied inverters, if a current fed push-pull converter was used, it would only be possible to produce current for an output line voltage above n.Vbat (where n is the turns ratio of the transformer). In other words, it would only be possible to generate an output voltage waveform between n.Vbat and the peak voltage of the domestic supply. This is because for output line voltages below this value, the voltage across the inductor L1 would be 0V as the reflected voltage at the transformer side of L1 would be equal to Vbat.

In order to generate an output line voltage across the range 0V to peak line voltage (which in embodiments is 325V), when the voltage of the line drops to n.Vbat, additional switches Q1 and Q2 are added. These two switches form a Buck-Boost circuit. It is possible for the DC to DC converter 120 to continuously operate in Buck-Boost mode. However, in order to reduce switching losses, the Buck-Boost switches are only operated when the line voltage is equal to of less than n.Vbat. In other words, as the Buck-Boost mode is only required when the line voltage is at or below n.Vbat, the Buck-Boost mode is only operated when the line voltage is at or below n.Vbat.

In order to determine when to operate Buck-Boost mode, the voltage across the battery is monitored. The product of the voltage across the battery and the turns ratio of the transformer is calculated. This is compared with the instantaneous output line voltage. When the result of this comparison indicates that the output line voltage is less than the product of the voltage across the battery and the turns ratio of the transformer, the Buck-Boost mode is activated. It should be noted that the mechanism to monitor the voltages and perform the calculation are not described hereinafter as they would be appreciated by the skilled person. For example, the process could be handled by a digital signal processor based on voltage samples taken from the DC to DC converter circuitry.

In the following description, it should be noted that Q1 and Q2 are switched. In other words, in the following description, the operation of the circuit in Buck-Boost mode will be described.

During the "on" time of the duty cycle, Q1, Q3 and Q4 are switched on (i.e. the switch is closed). In order to avoid "shoot-through" (i.e. a shorted path to ground), Q2 is switched "off" or is an open switch. As can be seen in graph A of FIG. 3, the drain voltage of Q2 during the "on" time is the battery voltage. As Q3 and Q4 are switched on, the voltage across both primary windings is 0V. Accordingly, the battery voltage appears across the first inductor L1. This means that current (IL) flows through the first inductor L1 and that current flows in the first and second primary winding of the transformer. In embodiments, current IL/2 will flow in each of the first and second primary winding. As would be appreciated by the skilled person, as no voltage appears across the first and second primary winding, no voltage will appear across the secondary winding. Accordingly, the output of the DC to DC converter 120 will be the current supplied by the fifth capacitor C5.

During the "off" time of the duty cycle, Q1 is switched off and Q2 is switched on. In order to avoid shoot-through, there is a slight delay between these transitions. During the first "off" time, Q3 is left on and Q4 is switched off. As Q1 is switched off, the voltage across the first inductor L1 reverses. The sixth switching transistor Q6 is a MOSFET transistor. Therefore, the drain of the sixth switching transistor Q6 is connected to the second capacitor C2. Accordingly, even though the sixth switching transistor Q6 is switched off, the diode effect within the sixth switching transistor Q6 acts as a commutation diode to reduce the effect of the sudden change in the voltage across the second primary winding of the transformer. The commutation diode clamps the peak voltage across the fourth switching transistor Q4 to 2Vline/n where Vline is the instantaneous voltage of the grid and n is the turns ratio of the transformer, which in embodiments is 3 (i.e. 3 times the number of coils on the secondary side of the transformer compared with the totality of the primary side).

After a short delay of around 20 ns the sixth switching transistor Q6 is switched on allowing current reversal. In other words, when. Q6 is switched on, current can flow out of the second capacitor C2 through Q6. As current flows through the second primary winding, via Q6 and the second capacitor C2, a voltage is induced in the secondary winding. This forward biases first diode D1 and therefore transfers energy to the unfolding circuit 130. This is shown by graph D in FIG. 3.

As is shown in graph E of FIG. 3, the drain current through the sixth switching transistor Q6 varies linearly over the off time of the duty cycle from +I1/2 to −I1/2. This is because the amp-seconds balance on clamp capacitor C2 must be maintained. During the subsequent "on" part of the duty cycle, Q4 needs to be switched on and Q6 needs to be switched off. It is advantageous to switch Q6 off slightly before Q4 is switched on. This is because as the current has reversed, the voltage across Q4 collapses allowing the turn-on of Q4 under zero voltage conditions. This reduces switching losses and therefore improves the efficiency of the DC to DC converter 120.

The next "on" time of the duty cycle is performed. In this, the switches and operation is the same as the previous "on" time and so will not be repeated here.

The next "off" time of the duty cycle is very similar to that explained above. However, during this "off" time, Q4 is left on and Q3 is switched off. Accordingly, Q5, which is a MOSFET switch, has a diode effect across its body which commutates the current through the first primary winding of the transformer. Therefore, the voltage across Q3 is 2VLine/n. Again, Q5 is switched on a short time later and the current reverses. This means that the voltage across the transformer is −Vline/2. As shown in graph E of FIG. 3, during this second "off" time, the drain current through Q5 varies linearly over the off time of the duty cycle from +I1/2 to −I1/2. Therefore, during the next "on" cycle, Q5 is switched off slightly before Q3 is switched on and again, the voltage across Q3 collapses allowing the turn-on of Q3 under zero voltage conditions.

As noted above, this explanation refers to the circuit operating in Buck-Boost mode. In other words, the above describes the operation of the DC to DC converter 120 when the line voltage is less than or equal to n.Vbat. When the line voltage is greater than n.Vbat, the DC to DC converter will operate in a Boost mode. In this situation, the switching of all the transistors is the same except Q2 is always off. Therefore, in the case that the DC to DC converter 120 is operating in the Boost mode, the voltage across L1 during the off-time drops from Vline/n to (Vline/n)−Vbat.

This means that when the DC to DC converter 120 switches between operating in Boost mode to Buck-Boost mode, the current through the inductor L1 can change rapidly. In order to reduce the effect of this, the Buck-Boost mode is activated slightly early. In other words, although it is possible to start operating in Buck-Boost mode when the line voltage is less than or equal to n.Vbat, the DC to DC converter 120 begins operating in Buck Boost mode when the output line voltage is n.Vbat+δ (where δ is a small voltage around 1.5V). Similarly, although it is possible to stop operating in Buck-Boost mode when the line voltage is greater than n.Vbat, the DC to DC converter 120 stops operating in Buck-Boost mode (and in Boost mode alone), when the output line voltage reaches n.Vbat+δ.

Although the above describes activating the Buck-Boost mode early by identifying when the output line voltage reaches n.Vbat+δ, potentially noise on the output line could inadvertently trigger a switch in the mode. In order to reduce the possibility of this, in embodiments the timing of the switch is changed. In other words, the Buck-Boost mode is triggered earlier in time than would normally be anticipated (rather than using voltage as the trigger). In order to achieve this, the phase of the output line voltage is monitored. During a complete cycle of the output voltage, the phase of the output will vary between 0 and 360°. The phase selected as the change over phase varies depending on the ratio of output line voltage to battery voltage. However, in typical embodiments, the phase at switch will be around 37°.

As noted hereinbefore, the above allows the DC to DC converter 120 to generate a current waveform that resembles a fully rectified AC current waveform at the output of the DC to DC converter 120. In order to apply this to the grid, the unfolding circuit 130 needs to generate a full-wave rectified sinusoid having an instantaneous voltage matching the grid. In order to achieve this, the unfolding circuit 130 is commutated at 100 Hz. In other words, the switching transistors Q10 and Q11 are commutated as one pair, and switching transistors Q9 and Q12 are commutated as a second pair. By commutating the switching transistors in this manner, the switching losses are reduced compared to conventional techniques where typical bridges are commutated at higher frequencies such as 20-50 kHz.

As noted above, the output current from the DC to DC converter 120 flows in D1 and D2. These two diodes act as rectifier diodes. Q7 and Q8 are MOSFETs. As such, they have body diodes. Q7 and Q8 also operate only when the grid tied inverter operates in the grid to battery mode as will be explained later. Therefore, during the battery to grid mode (or first mode) Q7 and Q8 are left off. However, even though Q7 and Q8 are off, as Q7 and Q8 are field effect transistors, they have a body diode effect even when switched off. To prevent the reverse recovery current of the body diodes from reducing efficiency, Schottky diodes D3 and D4 prevent current flow onto the positive and negative lines. In other words, Schottky diodes D3 and D4, are orientated to oppose the orientation of the body diodes of Q7 and Q8. If the Schottky diodes D3 and D4 were not present, the reverse recovery current of these body diodes circulates and appear on the primary side of the transformer. In embodiments, the reverse recovery current appears in the loop comprising of Q3 and Q4 during the "on" time. This increases the conduction losses for these devices. It should be noted here that any other type of diode would suffice (i.e. Schottky diodes are not necessary). However, Schottky diodes are better than any other type of diode because they have a lower turn on voltage which improves the efficiency of the circuit.

The operation of the circuit in the second mode (or grid to battery mode) will now be described. In the second mode, the transistors Q9 to Q12 (unfolding circuitry) are not switched, and remain static to form a rectifier circuit. In order to operate in the second mode, Q7 and Q8 are switched. Clearly, in order to avoid cross conduction, Q7 and Q8 are not switched to be "on" at the same time.

During the even "on" time during the grid to battery mode Q7 is switched on meaning that Q8 remains off. Current flows from the grid, through D4 and into the transformer winding (via C3). This induces a voltage of Vline/2 across C3 and thus the transformer winding. In buck-boost mode during the grid to battery mode, Q3 and Q6 are on, Q1 is off, and Q2 is on. This results in a voltage of n.Vline/2 being applied across L1. Due to the split winding, a voltage of Vline/n appears across Q4.

During the buck-boost "off" time, Q6 is switched off first. This reduces the voltage across Q4 to zero so that when Q4 is switched on during the next buck-boost "on" time, Q4 can be switched under zero voltage conditions which reduces losses significantly. This has already been explained with reference to the battery to grid mode. It should be noted however that during this "off" time, Q4 is still off. Additionally, Q7 is switched off. Thus, during this "off" time, Q6, Q7 and Q8 are off and Q2, Q3 and Q4 are on. Accordingly, the transformer voltage is zero with a current of IL/2 flowing through each of the primary winding legs. The voltage across L1 is therefore Vbat.

During the odd "on" time, Q8 is switched on and Q7 is off. Current flows from the grid, through. D3 and into the transformer winding (via C4). This induces a voltage of Vline/2 across C4 and thus the transformer winding. Therefore, a voltage of n.Vline/2 appears across L1.

It should be noted that the voltage appearing across nVline/2 assumes that the voltage across C3 and C4 is the same during each switching cycle. Although for the majority of cases, this is correct, there is a slight possibility that this may not always be the case. In the case that the voltage across C3 and C4 is not the same during each switching cycle, an imbalance in L1 occurs. This is because the voltage across C3 and C4 during the respective cycles appears across the transformer which charges L1. Therefore, over a number of cycles, the imbalance in L1 increases the difference between the voltages across C3 and C4. In other words, the presence of L1 acts to increase a voltage difference across the transformer during successive "odd" and "even" on times. This positive feedback results in saturation of the transformer core. As would be appreciated, during saturation, the transformer acts as a short circuit. As will be explained later, a balance winding may be introduced into the circuit to mitigate this effect.

Figure 4:
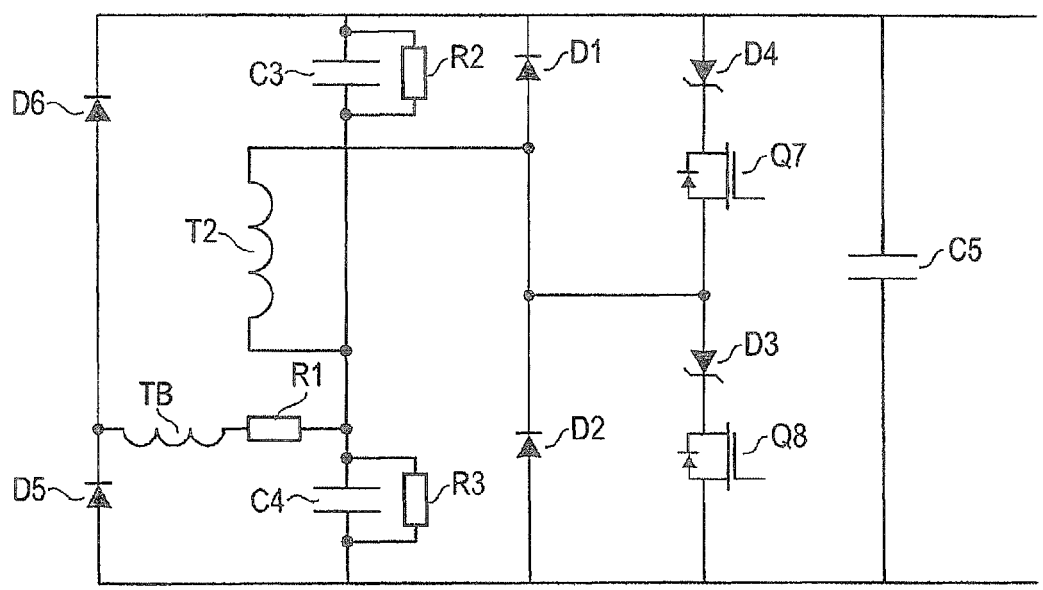
FIG. 4 shows the secondary side of the transformer according to embodiments of the present invention.

An example circuit configuration for the balance winding is schematically illustrated in FIG. 4. As will be appreciated from a comparison of FIG. 4 and FIG. 2, FIG. 4 shows a portion of the secondary side circuitry of the DC-DC inverter 120 shown in FIG. 2, with like circuit elements being indicated with like reference numerals. The secondary side transformer winding is identified in FIG. 4 as T2. In addition, FIG. 4 shows a number of additional circuit elements which are intended to prevent, or at least reduce, the incidence of transformer saturation. This additional circuitry includes a further winding TB which is connected at one end via a resistor R1 between the capacitor C3 and the capacitor C4, and is connected at its other end between a diode D5 and a diode D6. The diodes D5 and D6 are connected in series between the positive output rail and the negative output rail and are both oriented in the same direction (that is, towards one or other of the positive output rail and the negative output rail) as the diode D1 and the diode D2.

As will be appreciated, it is desirable that the end of the transformer winding T2 between the capacitors C3 and C4 be stable. In an ideal circuit, the voltage drop across C3 and C4 would be identical, achieving this, but in a real circuit an imbalance may arise at this point, resulting in transformer saturation. This is mitigated in the present case by the further winding TB which functions as one half of a potential divider, with the transformer winding T2 serving as the other half of the potential divider. It will be appreciated that, by configuring T2 and TB to store substantially the same amount of energy, for example by using the same or a similar number of transformer turns for each winding, the mid point between T2 and TB, and thus the mid point between the capacitors C3 and C4, can be stabilised. The resistor R1 serves to reduce the effect of ripple voltages on the windings, with any ripple voltages becoming superimposed across the resistor R1. If the resistor R1 was not present, a large current would flow through the balance winding.

In addition to the potential divider provided by the further winding TB, the midpoint between the capacitors C3 and C4 is also stabilised by connecting resistors R2 and R3 across the capacitors C3 and C4. The resisters R2 and R3 have substantially the same resistance, and form a further potential divider between the positive and negative rails to stabilise the mid point while the grid tied inverter is not switching.

Returning to the discussion about the grid to battery mode, as with the even "on" time, Q1 is off and Q2 is on. However, unlike the even "on" time, Q4 is switched on (under zero voltage conditions explained above), and Q5 is switched on. Q6 remains off and Q3 is switched off. The operation of the circuit is then similar to that explained with reference to the even "on" time. However, during the next "off" time, Q5 is switched off first so that when Q3 is switched on during the next buck-boost "on" time, Q5 can be switched under zero voltage conditions.

As with the battery to grid mode, in boost mode, Q1 is left on for the entire switching cycle to reduce the voltage across the inductor during the on time from Vline/n to (Vline/n)−Vbat.

Figure 5:
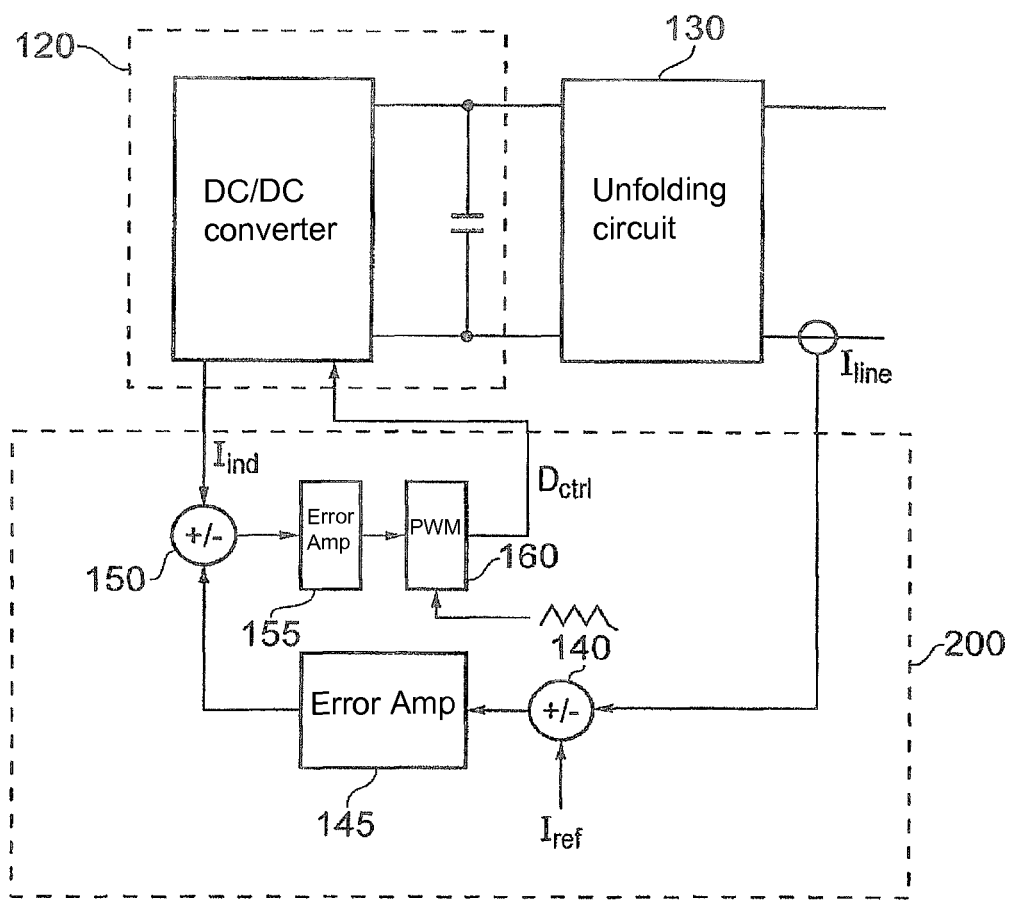
FIG. 5 shows a control loop which controls the duty cycle of the circuit shown in FIG. 2.

Control of the push-pull converter is implemented in part by setting the duty cycle of the DC-DC converter 120. More particularly, the ratio of the "on" time to the "off" time is varied with respect to time to generate a desired current waveform. The desired current waveform for output by the DC-DC converter 120 resembles a fully rectified AC current waveform. In one embodiment, this is achieved by way of a DSP (Digital Signal Processor) set reference current and inner and outer control loops. FIG. 5 schematically illustrates such a control circuit 200 and its connections to the DC-DC converter 120 and unfolding circuitry 130.

The control circuit 200 comprises an outer loop comparator 140 which receives a line current output $I_{line}$ from the unfolding stage 130 and a digitally synthesised reference current $I_{ref}$ received from a DSP (not shown). The outer loop comparator 140 generates an outer loop error signal $\epsilon_{outer}$ from the difference ($I_{line} - I_{ref}$) between the received line current $I_{line}$ and the reference current $I_{ref}$ and passes this to an outer loop error amplifier 145. The outer loop comparator 140 and the outer loop error amplifier 145 serve as an outer control loop. The outer loop error amplifier 145 amplifies the outer loop error signal $\epsilon_{outer}$ generated by the outer loop comparator 140 and passes it to an inner loop of the control circuit 200 as $E_{outer}$. In particular, the inner loop comprises an inner loop comparator 150 which receives the amplified outer loop error signal $E_{outer}$ from the outer loop and a measured inductor current $I_{ind}$ from the DC-DC converter 120. The inner loop comparator 150 generates an inner loop error signal $\epsilon_{inner}$ from the difference ($I_{ind} - E_{outer}$) between the measured inductor current $I_{ind}$ and the amplified error signal $E_{outer}$ from the outer loop. The inner loop error signal $\epsilon_{inner}$ is then passed to an inner loop error amplifier 155 which amplifies the inner loop error signal generated by the inner loop comparator 150 and passes it to a pulse width modulator 160, which used the amplified outer loop error signal to modulate a saw tooth reference waveform to form a duty cycle control signal $D_{ctrl}$. The duty cycle control signal. $D_{ctrl}$ then serves to control the timing of the switching of the various transistors described in FIG. 2. It will be appreciated that the duty cycle control signal $D_{ctrl}$ may not directly control all of the switches—in some cases an offset or inverted version of the duty cycle control signal $D_{ctrl}$ will be used to drive a particular switch, resulting in a desired relative timing delay between particular switch transitions.

It will be appreciated that the amplified outer loop error signal $E_{outer}$ represents a difference between the output current presently being output from the unfolding stage 130 and a digitally controlled reference current. It will be understood that the digitally controlled reference current is in effect a target current which the analogue circuitry of the DC-DC converter and the unfolding stage 130 is intended to follow. This outer loop process therefore drives a relatively slow change in the desired output line current. The inner control loop on the other hand changed rapidly as a function of the inductor current. The inductor current is in effect modulated in a particular direction by the error signal generated from the outer control loop to achieve the desired gradual change in line current via the duty cycle control signal $D_{ctrl}$.

As discussed above, the DC-DC converter is operable in both a buck boost mode and a boost mode. The purpose of the buck boost mode is to permit the output voltage to reach 0V, which is necessary in generating the desired output waveform. However, the additional transistor switching results in undesirable switching losses in the transistor Q2. In order to reduce the impact of these switching losses, the buck boost mode is active only during generation of a lower portion of a voltage waveform. During the upper portion of the voltage waveform the buck boost topology is not necessary to obtain the required voltage levels, and so a boost mode is used in which the transistor Q2 remains on.

Although the foregoing has been discussed with reference to a battery or batteries being the DC source, the invention is not so limited. Any type of DC source may be equally used.

Also, although the foregoing has been described with reference to circuit elements, in embodiments these elements may be controlled by a computer program. Such a computer program comprises computer readable instructions which, when loaded onto a computer configure the computer to perform the method of the embodiments. This program may be stored on a storage medium such as an optical disc or on a server for distribution on a network. The software may be stored on memory within the grid tied inverter which may provide the switching timings, for example using the digital signal processor.

The above DC-DC converter comprises a transformer. Various transformer types are possible. Planar transformers, for example providing windings mounted on a plurality of printed circuit boards, are known. A problem with such transformers is that the plural printed circuit board need to be structurally and electrically connected together during the assembly and manufacture process. More particularly, in a conventional planar transformer the windings would be separately soldered or welded together. It is believed that an increase in efficiency can be accomplished by creating the transformer from stamped parts or PCB sections and connecting these components using the main PCB, rather than directly. This may be better from an assembly and manufacturing perspective.

Figure 6A:
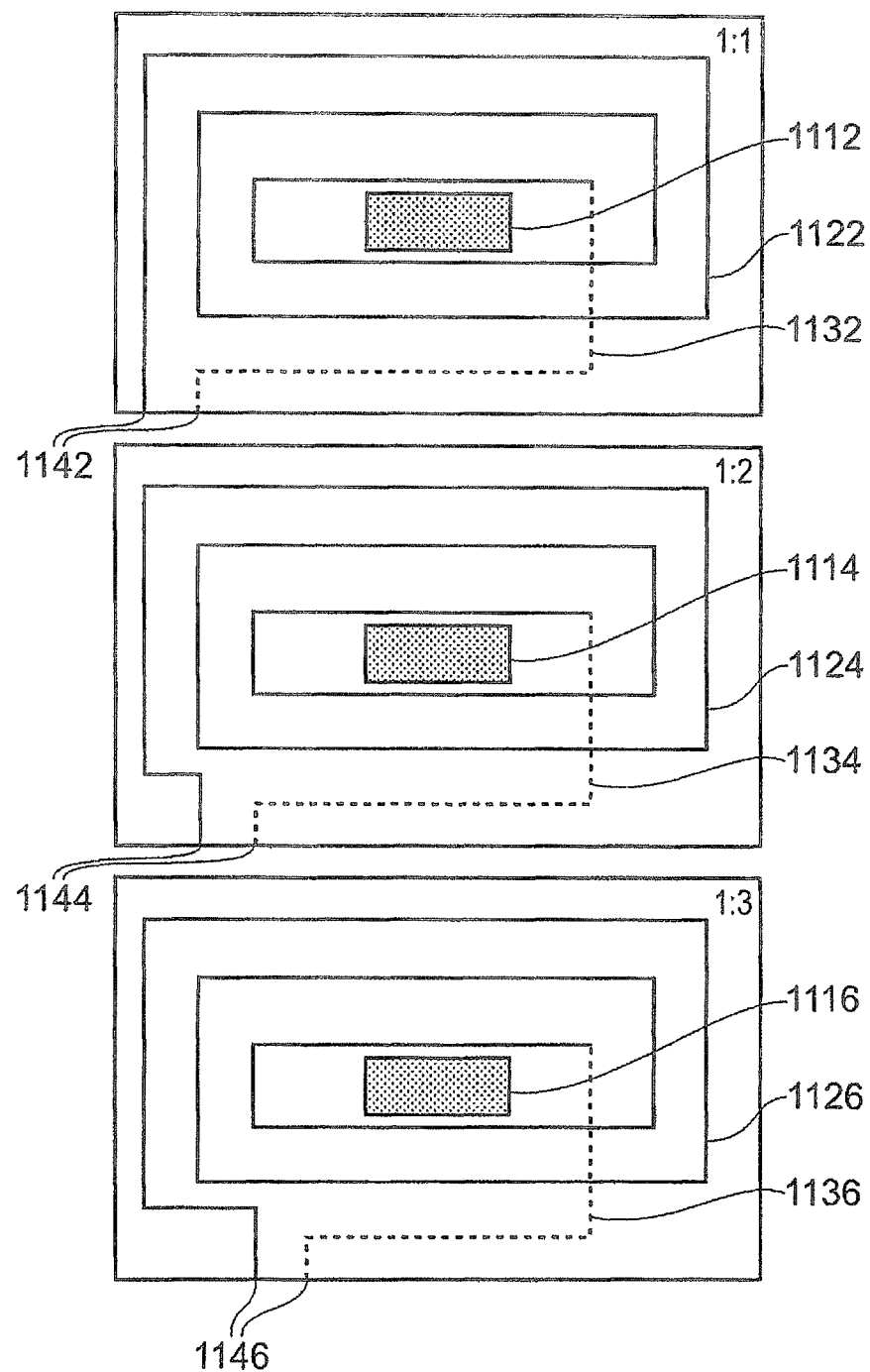
FIGS. 6A to 6C show a first configuration of planar transformer.
Figure 6B:
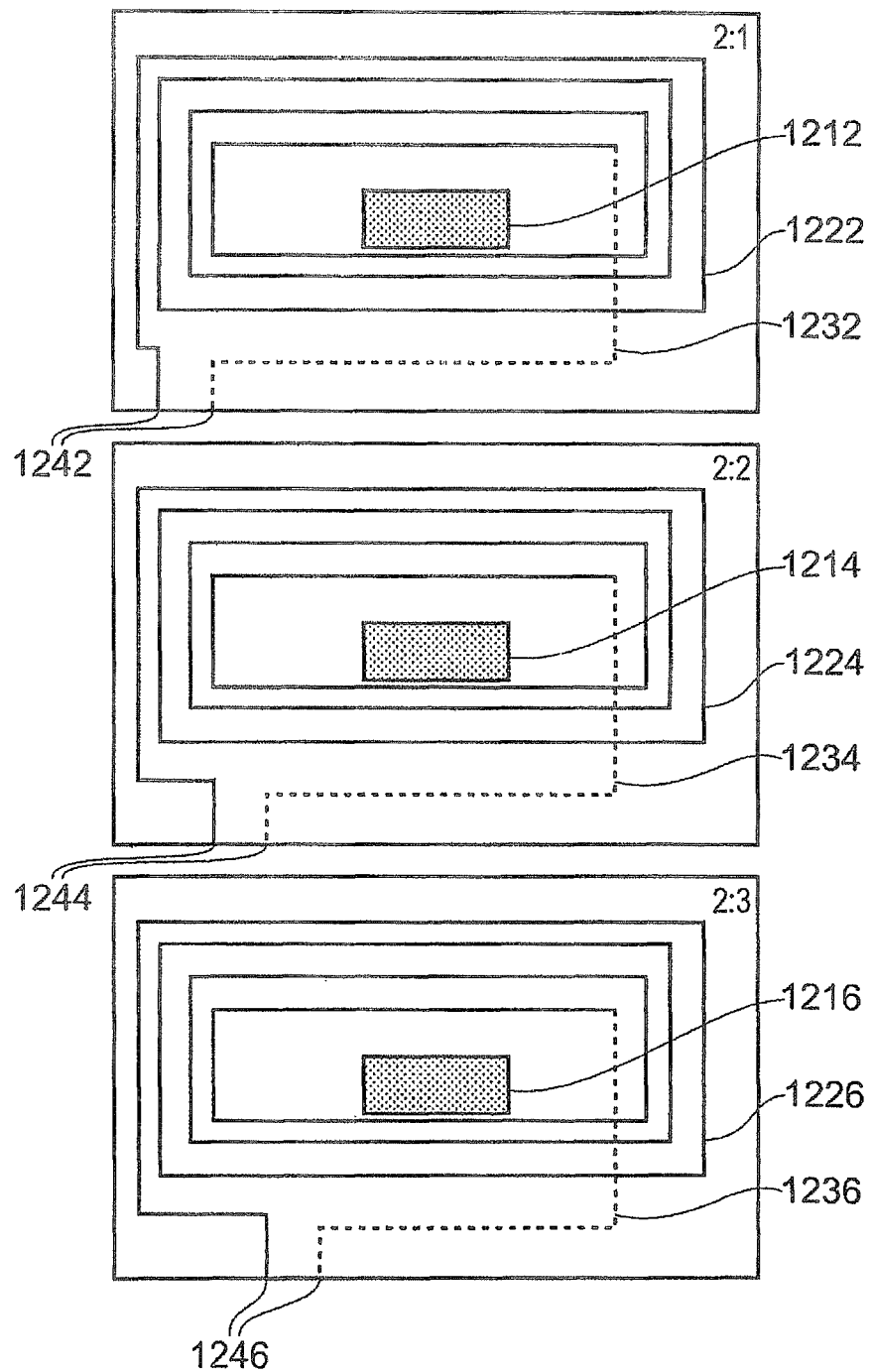
Figure 6C:
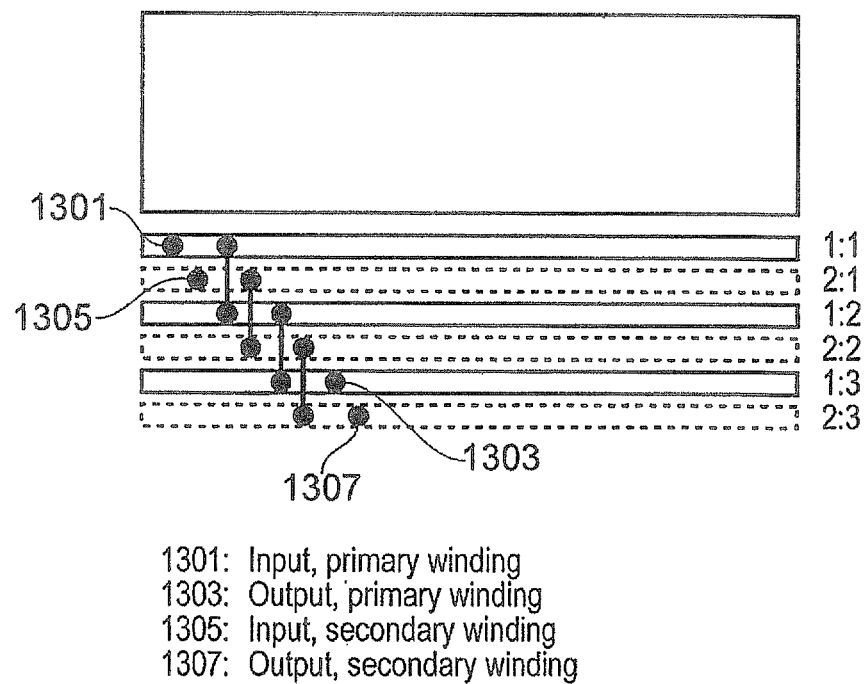

Referring to FIGS. 6A to 6C, a first configuration of such a planar transformer, utilising a stepped design, is schematically illustrated. Referring first to FIG. 6A, a primary winding is formed over three cards, 1:1, 1:2 and 1:3, each with a core receiving aperture 1112, 1114, 1116, a first side winding track 1122, 1124, 1126, a second side winding track 1132, 1134, 1136 and different terminal positions 1142, 1144, 1146 at the edge of the respective card. Each of the primary cards is intended for location in a respectively labelled slot in FIG. 6C. A secondary winding is shown in FIG. 6B, and is formed over three cards, 2:1, 2:2 and 2:3, again each with a core receiving aperture 1212, 1214, 1216, a first side winding track 1222, 1224, 1226, a second side winding track 1232, 1234, 1236 and different terminal positions 1242, 1244, 1246 at the edge of the respective card. Each of the secondary cards is located at a respectively labelled slot in FIG. 6C. FIG. 6C illustrates six slots of a motherboard to which the PCB transformer (in the form of the six cards of FIGS. 6A and 6B) is to be mounted. Connections between the slots in the motherboard serve to complete the circuits of the primary and secondary windings by connecting together the six cards. In a slot 1:1 dedicated to the card 1:1, an input connection 1301 is provided which serves as a first terminal for the primary winding. The other connection shown in slot 1:1 is used to connect to the slot 1:2 dedicated to the card 1:2. The slot 1:2 is connected to the slot 1:3 in a like manner. The slot 1:3 comprises an output connection 1303 which serves as a second terminal for the primary winding. In a slot 2:1 dedicated to the card 2:1, an input connection 1305 is provided which serves as a first terminal for the secondary winding. The other connection shown in the slot 2:1 is used to connect to the slot 2:2 dedicated to the card 2:2. The slot 2:2 is connected to the slot 2:3 in a like manner. The slot 2:3 comprises an output connection 1307 which serves as a second terminal for the secondary winding. The edge terminals of the cards and slots are stepped between cards to permit connections between slots.

Figure 7A:
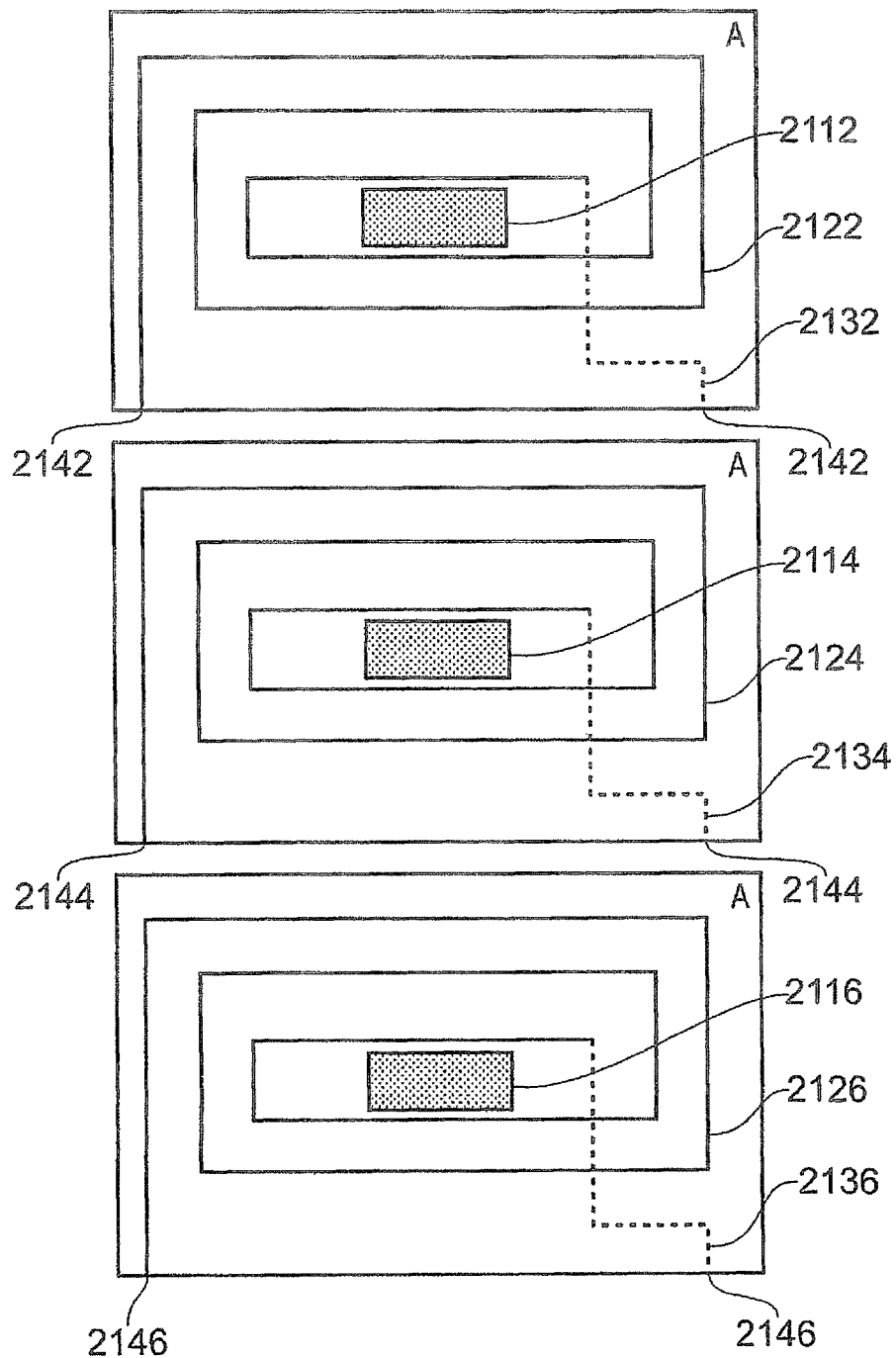
FIGS. 7A to 7C show a second configuration of planar transformer.
Figure 7B:
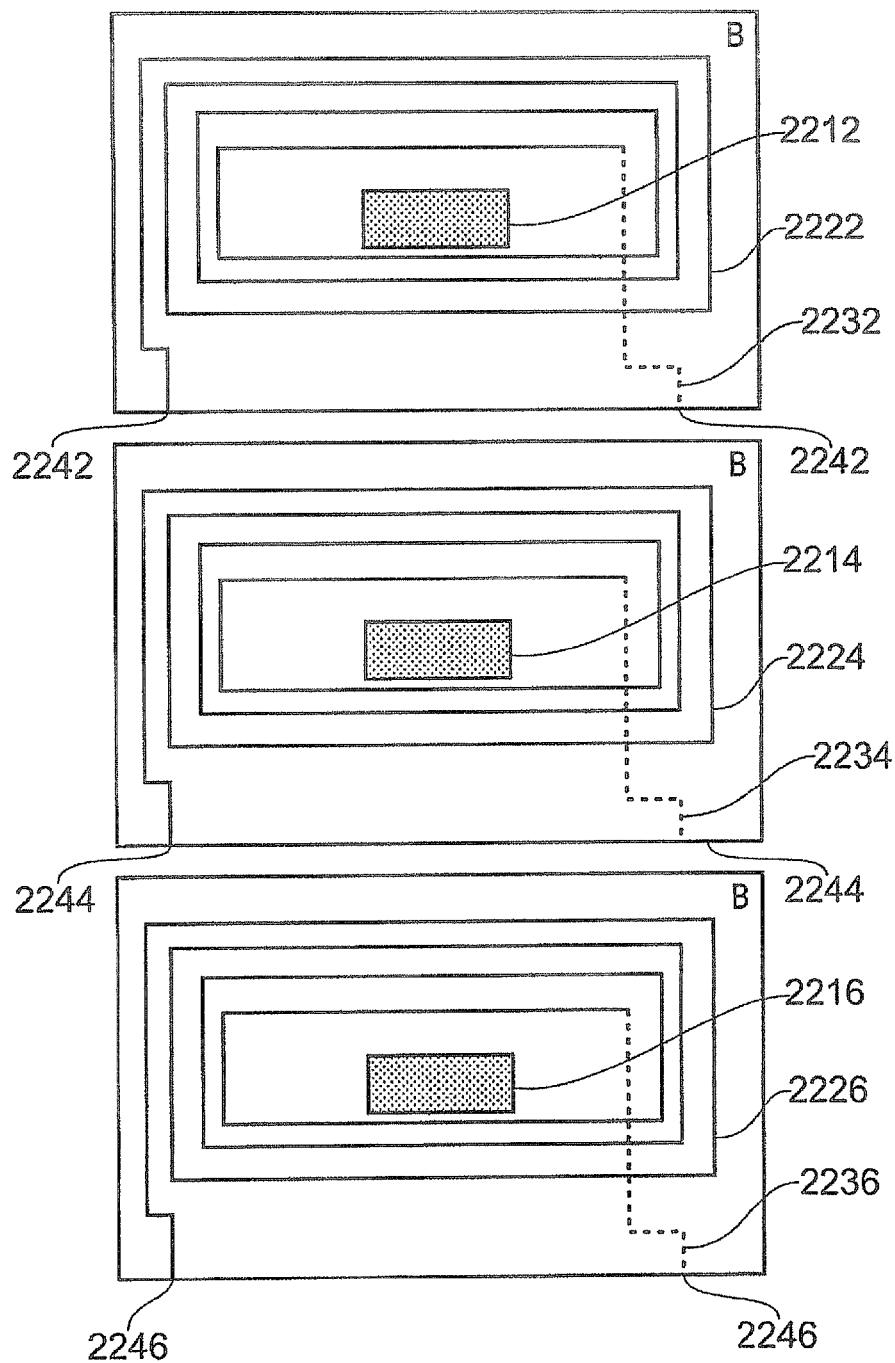
Figure 7C:
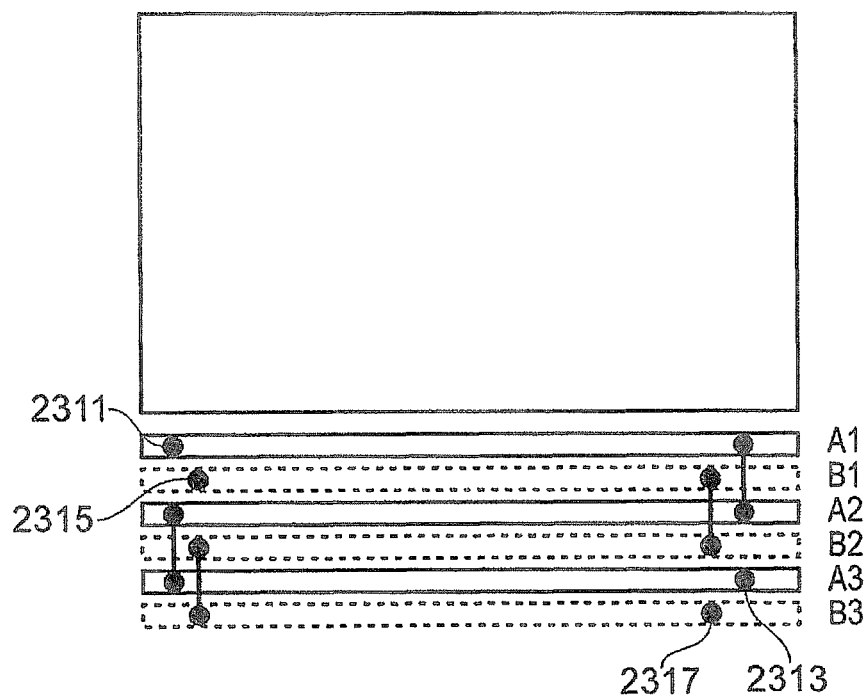

Referring to FIGS. 7A to 7C, a second configuration of a planar transformer, utilising a alternating design, is schematically illustrated. Referring first to FIG. 7A, a primary winding is formed over three identical cards A, each with a core receiving aperture 2112, 2114, 2116, a first side winding track 2122, 2124, 2126, a second side winding track 2132, 2134, 2136 and the same terminal positions 2142, 2144, 2146 at the edge of the respective card. Each of the primary cards is intended for location in a respectively labelled slot in FIG. 7C. A secondary winding is shown in FIG. 7B, and is formed over three identical cards B, again each with a core receiving aperture 2212, 2214, 2216, a first side winding track 2222, 2224, 2226, a second side winding track 2232, 2234, 2236 and the same terminal positions 2242, 2244, 2246 at the edge of the respective card. Each of the secondary cards is located at a respectively labelled slot in FIG. 7C. FIG. 7C illustrates six slots of a motherboard to which the PCB transformer (in the form of the six cards of FIGS. 7A and 7B) is to be mounted. Connections between the slots in the motherboard serve to complete the circuits of the primary and secondary windings by connecting together the six cards. In a slot A1 dedicated to one of the A cards, an input connection 2311 is provided which serves as a first terminal for the primary winding. The other connection shown in slot A1 is used to connect to the slot A2 dedicated to a second of the A cards. The slot A2 is connected to the slot A3 in a like manner. The slot A3 comprises an output connection 2313 which serves as a second terminal for the primary winding. In a slot B1 dedicated to one of the B cards, an input connection 2315 is provided which serves as a first terminal for the secondary winding. The other connection shown in the slot B1 is used to connect to the slot B2 dedicated to a second of the B cards. The slot B2 is connected to the slot B3 in a like manner. The slot B3 comprises an output connection 2317 which serves as a second terminal for the secondary winding. The edge terminals of the cards are identical in this embodiment, and the terminals within subsequent slots of a particular winding are alternated in orientation to permit connections between slots. In this case, current flow reverses each time so that the cross-slot connection can alternate between one end of the slot and the other. An advantage of this configuration is that each of the primary cards (A) can be the same (no need to step the terminal positions), and each of the secondary cards (B) can be the same.

A method of manufacturing a transformer is envisaged, comprising the steps of:

providing a first plurality of cards carrying portions of a primary winding, and a second plurality of cards carrying portions of a secondary winding, each portion comprising an electrically conducting track having two terminals at one edge of the card;

providing a board having a plurality of slots for receiving the first plurality of cards and the second plurality of cards, the slots being electrically connected together; and inserting the first plurality of cards and the second plurality of cards into the plurality of slots; wherein the electrical connections within the plurality of slots complete a circuit with the first plurality of cards to form the primary winding, and complete a circuit with the second plurality of cards to form the secondary winding.

Figure 8:
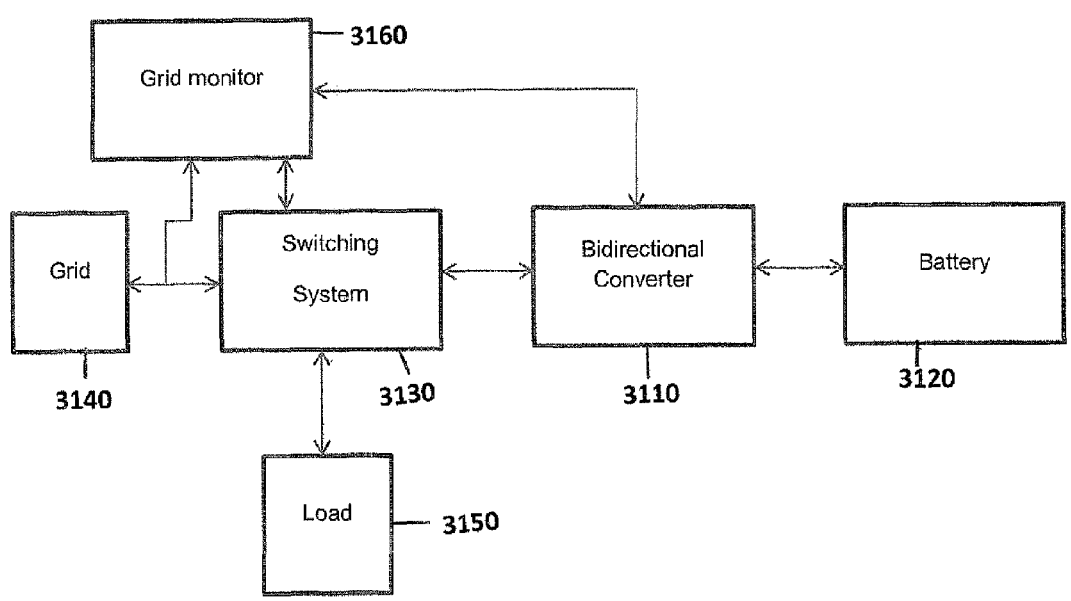
FIG. 8 shows an Uninterruptable Power Supply (UPS)

In FIG. 8, the application of the AC tied inverter to a uninterruptable power supply (UPS) is shown. In FIG. 8, a bidirectional converter (AC tied inverter) 3110 is disposed between a battery 3120 and a switching system 3130. The switching system 3130 serves to connect and disconnect the converter 3110 and an electrical load 3150 requiring AC and making use of the battery 3120 (the electrical load may be any power using device such as a computer) to an electrical grid, 3140 or indeed a diesel generator for an outside broadcast truck for example.

The UPS comprises a grid monitor 3160 for monitoring the grid voltage or other electrical performance parameter and controlling the operation of the switching system 3130 based thereon.

When a suitable electricity supply is available from the grid 3140, the grid is connected to the converter 3110 using the switching system 3130. The battery 3120 will be charged until it is full. The load 3150 is connected to the grid 3140 via the switching system 3130.

The grid monitor 3160 measures the grid voltage (for example). If it starts to fall and is going out of specification the converter 3110 will supply power to the load 3150 from the battery 3120 and the switching system 3130 will disconnect the grid 3140 from both the converter 3110 and load 3150.

When the grid monitor 3160 determines that the grid 3140 is back within specification, the converter 3110 resynchronises its phase to that of the grid 3140. Then the switching system 3130 will then connect the load 3150 back to the grid 3140 and the converter 3110 may then charge the battery 3120.

The switching system 3160 may be configured to switch both live and neutral or optionally neutral only.

It will be appreciated that the grid as described in the current patent application can be a national grid or a local supply, for example from a series of generators and uninterruptable power supplies (UPS) at an outside broadcast event.

Some embodiments can be used to support peak load. If the generator has capacity to spare the battery is charged. If the generator is struggling to provide sufficient power the system could deliver power from the battery to the grid. This may allow smaller generator to be used.

Figure 9:
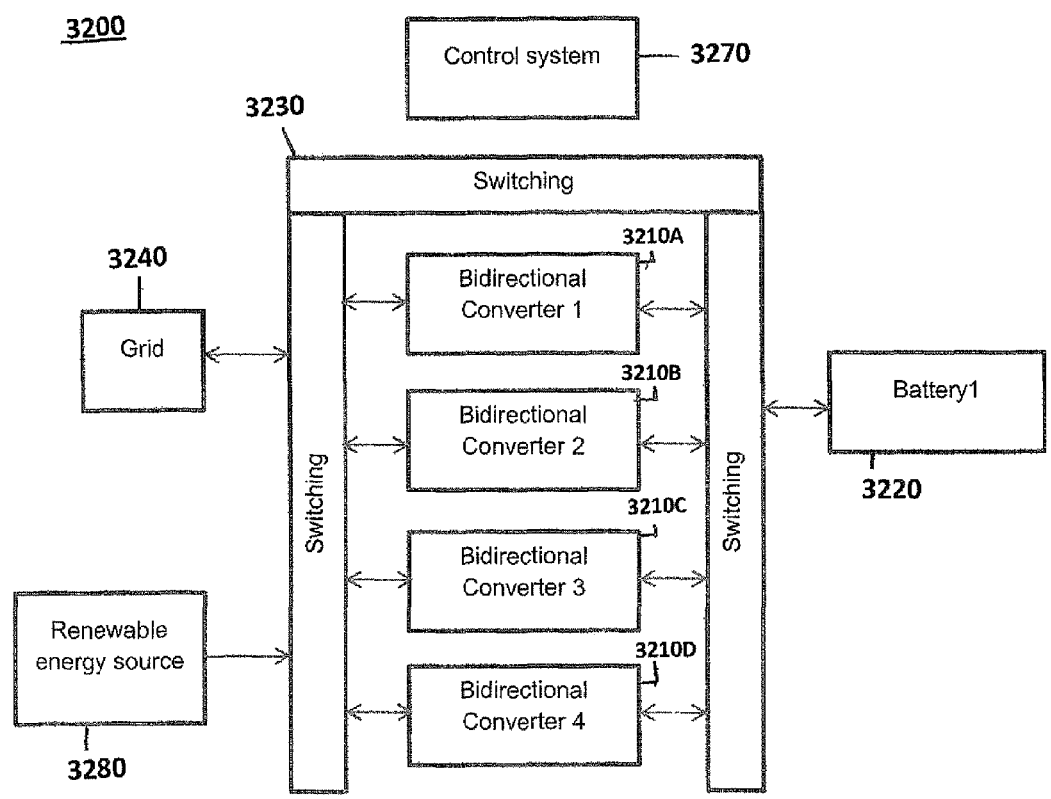
FIG. 9 shows a modular arrangement of AC tied inverters.

In FIG. 9, a modular implementation is shown. An electricity handling device 3200 is provided which can carry multiple cards 3210*a*, 3210*b*, 3210*c*, 3210*d* each providing a bidirectional converter (AC tied inverter) as described above, thereby allowing flexible functionality.

The electricity handling device 3200 consists of one or more converter modules 3210*a*, 3210*b*, 3210*c*, 3210*d* and one or more batteries 3220. For example it may contain 1 battery and 4 converter modules as shown and be linked to a grid 3240 and a renewable energy source 3280. Each of the converter modules 3210*a*, 3210*b*, 3210*c*, 3210*d* may be rated at a power of 250 W for example.

A control system 3270 is provided which can flexibly control the bidirectional converter modules 3210*a*, 3210*b*, 3210*c*, 3210*d* allocating them to transfer power. Combined with a switching system 3230 power may be transferred grid to battery, battery to grid, renewable energy source to battery or renewable energy source to grid as required by circumstances.

The power transfer may vary during the day, for example with a solar renewable energy source:

1. Night time: 2 modules transferring AC power grid to DC battery to store low cost off peak electricity from the grid.
2. Early morning; one module DC solar to AC grid and 3 modules DC battery to AC grid to support morning peak power consumption in the house.
3. Middle of the day: 3 modules DC solar to DC battery to support peak solar output, one module DC solar to AC grid to support base electrical load in the house.
4. Early evening; one module DC solar to AC grid and 3 modules DC battery to AC grid to support the evening peak power consumption in the house.

Batteries may be a combination of fixed in the house and removable such as batteries for electric bikes or cars.

It will be appreciated that the converter can support both AC to DC conversion and also DC to DC conversion by setting the switching configuration of FIG. 2 appropriately.

An application for this flexibility is as part of a solar energy storage system where the same converter can be used to allow power flow:

(A) DC solar power to AC grid;
(B) AC grid power to charge DC battery; and
(C) DC solar energy to DC battery Function (B) corresponds to the grid to battery operation described in detail above. Function (A) is supported by operating the battery to grid mode described above, but with the DC solar source replacing the battery. Function (C) is achieved by providing a further operation mode of the unfolding circuitry of FIG. 2, in which the AC line input is replaced by a battery. A DC source, such as a solar panel is connected in place of battery 110. In this case, referring to FIG. 2, the positive input may be connected to the junction of Q10 and Q12. Q10 will be on and Q12 will be off. The negative may be connected to the junction of Q9 and Q11. Q9 will be off and Q11 will be on. This configures the FIG. 2 unfolding circuitry in a DC-DC mode. It will therefore be appreciated that separate DC-DC circuitry is not required.

In another application, the bidirectional converter can be used to store charge to even out distribution to the grid from a wind turbine, rather than or in addition to modifying the angle of the turbine blades.

In particular, small scale wind turbines typically have fixed pitch blades. These may produce either AC or DC output depending on the type of generator fitted. In AC systems the output frequency is dependent on the speed of rotation of the blades. As a result they are not suitable for direct connection to the grid which is fixed frequency.

The converter is capable of supporting both AC and DC input (and can therefore receive an input for either and AC or DC type generator). Furthermore, the converter can support variable frequency AC input which is required for variable speed rotation AC system. This is because the control loop described above in relation to FIG. 5 enables synchronisation to a non-fixed frequency AC source. In the context of the grid this control loop functionality is simply used to compensate for slight phase errors, however the principle can be extended to handle large variations as would be the case for the operating range of a wind turbine.

Figure 10:
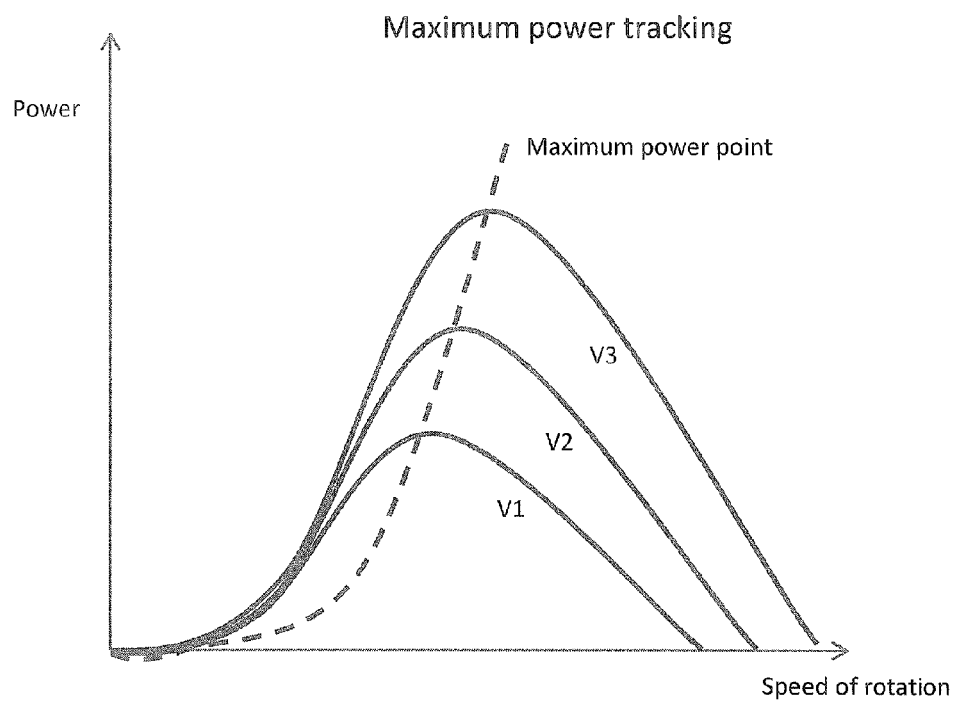
FIG. 10 shows power tracking for a wind turbine generator.

In particular, the converter can vary the electrical load presented to the wind turbine to support maximum power tracking, which significantly improves the output power over a wide range of wind speeds. This can be seen from FIG. 10, in which a power profile with respect to the speed of rotation of the turbine blades is shown for three different wind speeds V1, V2 and V3. It can further be seen that the maximum power point varies for different wind speeds, and the electrical load can be set to take this into account and therefore attempt to provide maximum power tracking with respect to wind speed.

The wind turbine application can be provided by using the unfolding circuit in yet another mode of operation. In particular, the AC line input may be replaced by an AC source such as a wind generator. This may have variable frequency of operation depending on the speed of rotation of the turbine in contrast to a normal grid line frequency of 50 or 60 Hz. The frequency of the control signals to the gates of 0-11 is adjusted to suit the frequency of the source, such that they rectify the AC signal.

In this mode of operation, as well as the DC-DC solar energy to battery mode described above, the system may implement maximum power point tracking to seek to maximise the output from the renewable energy source.

The invention claimed is:

1. An electricity handling device comprising:
an AC tied inverter;
an electrical interface configured to connect to each of a load device powered by an AC source, the AC source, and an energy source;
a switching system configured to connect the AC tied inverter to the AC source, and the AC source to the load device; and
a grid monitor configured to detect when the AC source is failing and to control the switching system to disconnect the AC tied inverter from the AC source and disconnect the load device from the AC source,
wherein when the AC tied inverter and the load device are disconnected from the AC source, the AC tied inverter provides power to the load device from the energy source,
wherein the AC tied inverter comprises a DC to DC current fed push-pull converter configured to generate a rectified current waveform from a DC voltage source, the rectified current waveform being substantially synchronized to the AC source, and
wherein the DC to DC current fed converter comprises a buck-boost stage connectable to the DC voltage source, wherein the buck-boost stage is active only during generation of a lower portion of a voltage waveform at an output line.

2. The electricity handling device according to claim 1, wherein the AC tied inverter comprises
an unfolding circuit connectable to the AC source
wherein the unfolding circuit is configured, in a first mode, to convert the current into a sinusoidal waveform having an instantaneous voltage suitable for injection onto the AC source.

3. The electricity handling device according to claim 2, wherein the unfolding circuit, in a second mode, is configured to convert AC electricity obtained from the AC source into a fully rectified AC current, and the DC to DC current fed push-pull converter is further configured to convert the fully rectified AC current into a DC current for storage in a battery.

4. The electricity handling device according to claim 3, wherein the unfolding circuit comprises a bridge arrangement of transistor switches, and the transistor switches each comprise a field effect transistor.

5. The electricity handling device according to claim 4, wherein the field effect transistors are configured such that body diodes within the transistors are arranged as a full-bridge rectifier, and configured such that in use during the second mode, the switching transistors are open.

6. The electricity handling device according to claim 2, wherein the DC to DC current fed converter comprises a transformer including a first side and a second side, the first side having a first winding which is connected to a first transistor switch and a second transistor switch, the second transistor switch is a field effect transistor having an anode of a body diode connected to the first winding, whereby the first switch is connected to ground and the second switch is connected to a first capacitor, the first capacitor being connected between the second switch and ground,
wherein to allow current flow through the first winding, the first switch is configured to be on and the second switch is configured to be off, and after a predetermined period of current flow, the first switch is configured to be off, whereby a predetermined period thereafter the second switch is configured to be on.

7. The electricity handling device according to claim 6, wherein prior to the first switch being switched on again, the second switch is configured to be switched off.

8. The electricity handling device according to claim 1, wherein when the grid monitor detects that the AC source has been restored the grid monitor controls the switching system to reconnect the load device to the AC source.

9. The electricity handling device according to claim 1, wherein the AC source is a diesel generator, a wind turbine, or a local electricity distribution system.

10. The electricity handling device according to claim 1, wherein the AC tied inverter comprises a transformer having a first side connectable to a battery and a second side connectable to the AC source, wherein each of two primary windings of the first side of the transformer is connected to ground via a switching transistor; and
respective voltage clamps are connected between the respective primary windings of the transformer and the respective switching transistors, the voltage clamps commutating current from the respective primary sides of the transformer when the switching transistor is turned off.

11. The electricity handling device according to claim 10, wherein the two primary windings of the first side of the transformer include a first primary winding which is connected to a first transistor switch and a second transistor switch, the second transistor switch is a field effect transistor having the anode of the body diode connected to the first primary winding to connect the first switch to ground and the second switch is connected to a first capacitor, the first capacitor being connected between the second switch and ground,
wherein to allow current flow through the first primary winding, the first switch is configured to be on and the second switch is configured to be off, and after a predetermined period of current flow, the first switch is configured to be off, and a predetermined period thereafter the second switch is configured to be on.

12. The electricity handling device according to claim 11, wherein prior to the first switch being switched on again, the second switch is configured to be switched off.

13. The electricity handling device according to claim 1, wherein the AC tied inverter further comprises a transformer including a first side connected to the DC to DC current fed converter and a second side having an output line connectable to the AC source.

14. An electricity handling device comprising:
an AC tied inverter;
an electrical interface configured to connect to each of a load device powered by an AC source, the AC source, and an energy source;
a switching system configured to connect the AC tied inverter to the AC source, and the AC source to the load device; and
a grid monitor configured to detect when the AC source is failing and to control the switching system to disconnect the AC tied inverter from the AC source and disconnect the load device from the AC source,
wherein when the AC tied inverter and the load device are disconnected from the AC source, the AC tied inverter provides power to the load device from the energy source,
wherein the AC tied inverter comprises a DC to DC current fed push-pull converter configured to generate a rectified current waveform from a DC voltage source, the rectified current waveform being substantially synchronized to the AC source, wherein the push-pull inverter includes a transformer including first side winding connectable to a battery and a second side winding connectable to the AC source, wherein a first end of the second side winding of the transformer is connected between a first diode and a second diode, the first diode and second diode being connected in series between a positive output rail and a negative output rail and being oriented in a same direction;

a second end of the second side winding of the transformer is connected between a first capacitor and a second capacitor, the first capacitor and second capacitor being connected in series between the positive output rail and the negative output rail;

a further winding is connected at one end between the first capacitor and the second capacitor, and is connected at its other end between a third diode and a fourth diode, the third diode and the fourth diode being connected in series between the positive output rail and the negative output rail and both being oriented in a same direction as the first diode and the second diode.

15. The electricity handling device according to claim 14, wherein the further winding has substantially a same number of turns as the second side transformer winding.

16. The electricity handling device according to claim 14, wherein the further winding is connected at the one end to the first capacitor and the second capacitor via a resistor.

17. The electricity handling device according to claim 14, wherein a resistor is connected across the first capacitor.

18. The electricity handling device according to claim 14, wherein a resistor is connected across the second capacitor.

19. The electricity handling device according to claim 14, wherein a first field effect transistor and a second field effect transistor are connected in series between the positive rail and the negative rail, body diodes of each of the first and second field effect transistors being oriented in a same direction; and the second end of the second transformer winding is connected between the first and second field effect transistors.

* * * * *